United States Patent [19]
De Niel et al.

[11] Patent Number: 5,133,846
[45] Date of Patent: Jul. 28, 1992

[54] SILVER RECOVERY DEVICE

[75] Inventors: Marc A. De Niel, Brussels; Herman M. Engels, Wuustwezel; Marc J. Scheerders, Melsele; Dirk F. De Ruijter, Deurne; Bartolomeus J. Verlinden, Genk; Benedictus J. Jansen, Geel, all of Belgium

[73] Assignee: AGFA-Gevaert N. V., Mortsel, Belgium

[21] Appl. No.: 612,854

[22] Filed: Nov. 14, 1990

[30] Foreign Application Priority Data

Nov. 20, 1989 [EP] European Pat. Off. ......... 89202932.3
Mar. 30, 1990 [EP] European Pat. Off. ......... 90200772.3

[51] Int. Cl.$^5$ ............... C25D 21/12; C25D 21/18; B01D 21/30; C02F 9/00
[52] U.S. Cl. .................... 204/194; 204/234; 204/237; 204/236; 210/143; 210/195.1; 210/269; 210/284; 210/287
[58] Field of Search ............. 210/287, 284, 195.1, 210/143, 269; 204/109, 234, 275, 232–233, 194, 237

[56] References Cited

U.S. PATENT DOCUMENTS

| 3,761,381 | 9/1973 | Yagishita | 204/232 X |
| 4,612,115 | 9/1986 | Titoff | 210/269 X |
| 4,800,005 | 1/1989 | Rosenfield et al. | 204/109 |
| 4,855,046 | 8/1989 | Meehan | 210/284 X |

FOREIGN PATENT DOCUMENTS

| 2741080 | 3/1979 | Fed. Rep. of Germany | 204/109 |
| 2132635 | 7/1984 | United Kingdom | 204/109 |

*Primary Examiner*—Donald R. Valentine

[57] ABSTRACT

Silver is recovered from the rinse water from a photographic film processing unit by means of a silver recovery device in which the rinse water is passed through at least one bed of ion exchange resin particles maintained in fluidized condition by the water flow. A plurality of such beds are preferably connected in series with rinse water being recirculated until fresh rinse water causes overflow to the next bed and finally to a collection vessel. Fluidization is interrupted periodically to create quiescent periods which aid in removal from the resin particles of accumulated gelatin from the processed film.

21 Claims, 8 Drawing Sheets

SILVER RECOVERY DEVICE

BACKGROUND OF THE INVENTION

1. Field of the Invention

The present invention relates to a silver recovery device for recovering silver from photographic rinsing water by ion exchange.

2. Description of the Prior Art

To recover silver from the rinse water of a photographic processor, there exist the following available alternatives: electrolytic recovery, metallic replacement, precipitation and ion exchange. It has been established that ion exchange is the least expensive and also the most effective technique for reducing the silver content to a rate that is low enough for effluent water.

Ion exchange can be defined as a reversible exchange of ions between a solid (resin) and a liquid (water containing ionized salts). Silver in the rinsing water is in the ionized form of silver complexes, more particularly silver thiosulfate compounds, e.g. $[Ag(S_2O_3)_2]^{-3}$ and $[Ag(S_2O_3)_3]^{-5}$. Conventionally, to recover the silver, a strong base anion exchange resin is used. In this resin, chloride is the mobile ion and it exchanges with the silver thiosulfate to release a chloride ion while capturing the silver complex, e.g. according to the following scheme:

A serious problem encountered with ion exchange of photographic rinsing water is that gelatin clogs the resin and restricts the liquid flow.

It has been proposed to operate with flow and counterflow through the resin. Rinse water flows through resin in a first column to the bottom, the silver becoming captured by the resin and the gelatin becoming physically deposited on the resin. From the bottom of this first column, the water is fed through the bottom of a second column where it vigourously agitates the resin and washes out the entrapped gelatin. After some time the flow through the two columns is reversed so that the second column acts as the silver exchange column while the first column is backwashed. This method is disclosed in SMPTE Journal, Vol. 86, No. 2, February 1977 pages 65 to 68.

A similar method, wherein the rinsing water is used to fluidize a resin bed and wash out the entrapped gelatin is disclosed in the Journal of Imaging Technology, Vol. 10, No. 6, December 1984, pages 244 to 246. Also in this case two resin columns are used in series, the liquid flow being reversed periodically.

The mentioned installations perform well in practice, but are expensive because of the pressurized columns and the valves that are required to reverse the liquid flow. In the case of large scale installations the valves do not raise problems with clogging because they are large and their pneumatic control overcomes occassional blocking.

If this kind of installation is used on a small scale, however, the valves will normally be solenoid-operated and experience shows that a trouble-free operation may raise difficulties in the long run.

SUMMARY OF THE INVENTION

Objects of the Invention

It is one object of the present invention to provide a silver recovery device for recovering silver from photographic rinse water, which is simple of construction and is free of flow controlling components that are liable to clogging.

It is a further object of the invention to provide a silver recovery device for rinse water, in which the rate of flow of the rinsing water through the ion exchange resin is larger than the rate of flow of the rinse water discharged by the photographic processor.

It is a still further object to provide a silver recovery device for rinse water of a photographic processor, that operates with an ion exchange resin that can be regenerated through the intermediary of an on-line silver recovery device for the fixing station of the processor or of an off-line supply with regeneration fluid, so that the operation of the device can go on for years without the production of any waste.

Statement of the Invention

According to the invention, a silver recovery device for recovering silver from rinsing water from photographic processing apparatus by means of a bed of ion exchange resin which is fluidized by the rinse water, comprises a holder for ion exchange resin, said holder having a liquid inlet opening at the bottom, the device having a first and a second outlet opening for the liquid of the resin holder, the second outlet opening being located higher than the first one, circulation pump means for pumping liquid that flows out through said first outlet opening to the inlet opening of the resin holder, the inlet of the device being at the suction side of the circulation pump means, and the outlet of the device being at the second outlet opening.

Since the pressure side of the circulation pump means is connected to the inlet opening of the resin holder, it is clear that only a vertically upward liquid flow can exist in the holder. The complete absence of any flow reversal means in the circulation circuit in the form of three-way valves or the like, renders the reliability of the device high.

According to a suitable embodiment of the invention, the silver recovery device comprises control means for controlling the operation of the circulation pump means such that during the operative period of the photographic processing apparatus said pump means is continuously operative, and that during at least part of the inoperative period of the apparatus the operation of the pump means is intermittent. It has been shown that this way of operation is very effective to liberate gelatin that might have been deposited on the resin and that tends to clog the mass of resin, since under the influence of gravity the resin bed slowly sinks to the bottom of the holder and expands its volume.

Occasionally, the pump means may be controlled to obtain also during the operative period of the photographic processor short rest periods during which the resin bed is no longer fluidized and sinks slowly to the bottom of the cartridge.

A further embodiment of the invention is as follows.

The ion exchange resin holder is in the form of a tank, and the resin is contained in a cartridge which removably fits in the tank. This feature has the advantage of easy replacement of a used resin, by lifting a cartridge with used resin from the tank and substituting a cartridge with fresh resin. Such fresh resin may be new resin, but it may also be, and preferably is, used resin that has been regenerated.

Regeneration may be carried out by placing a cartridge with used resin in another holder wherein a liquid flow is sustained that can regenerate used resin. This liquid flow may suitably be the fixing circuit of the photographic processing apparatus since a fixing solution may have a regenerating effect on a used ion exchange resin, depending on the type of resin.

A still further embodiment of the invention is one in which the ion exchange resin is not contained in a cartridge that is transferable in view of its regeneration, but instead the ion exchange resin holder has the form of a container or pack which is connected into the liquid circuit of the recovery device. In case the regeneration of the resin can proceed by the fixer solution of the photographic processing apparatus, the container may be connected in the circuit through three-way valves, so that in the periods of use and rest of the ion exchange resin the container is connected in the rinsing water circuit of the photographic processor, but that for the regeneration of the resin the container becomes switched in the fixer circuit of the processor. In this way the operator of the processor is not required to perform any handling with the container with the ion exchange resin. It has been shown that the sequences of use and regeneration of the resin can go on for several years. When the moment has come to replace the resin, a service man simply has to disconnect the container from the liquid circuit of the processor, and to replace it by a new one.

It will be understood that in the case of resin regeneration through the intermediary of the fixer liquid of the photographic processor, the latter shall preferably be provided with an electrolytic silver recovery device in order to keep the silver contents of the fixer liquid sufficiently low.

In case the latter described embodiment of the invention is used, it is preferable that the first and second outlet opening of the device are formed in a separate control holder which is in liquid communication with the holder with the ion exchange resin, said control holder having a bottom opening which communicates with the inlet of the circulation pump means.

This construction has the advantage that the holder for the ion exchange resin need only be a simple envelope, in the form of a container or pack, with only an inlet and an outlet connection, arranged for easy manifolding in the circuit. The functions of the two distinct outlet openings are in this case performed by the control holder which constitutes a permanent part of the device.

The inlet of the device may in the case of a separate control holder be formed by a connection in the conduit from the control holder to the suction side of the pump means, but the inlet may also be formed by a separate inlet opening in the control holder.

In one embodiment of the inventive silver recovery device with suchlike control holder, the first and second outlet opening are common to one conduit that supplies liquid that passed through the ion-exchange resin, the first outlet opening discharging into the control holder and the second outlet opening discharging in a next holder and having a flow resistance such that liquid only starts to flow out after the back-pressure on the first opening has reached a certain value.

One way of establishing a back-pressure on the first opening that causes liquid to flow out at an increased rate through the second opening, is the use of valve means, e.g. in the form of a ball floating on the liquid in the control holder, said floating ball co-operating directly with the said first outlet opening in said holder. However, the closing of the first opening may also occur by the liquid itself, such as in the case in which this opening is located well below the normal level of the liquid in the holder so that the liquid in the holder causes a back pressure which is sufficient to cause the liquid to start to flow out at an increased rate through the higher located second opening.

The exact level control of the control holder may be obtained by dividing the control holder in two compartments which communicate with each other via an opening at the bottom, the second compartment having an overflow edge which forms the second outlet of the holder, the first outlet opening being located in the first compartment of the holder.

A liquid sensor may be provided in the control holder at a height such that it is above the liquid level in the holder that is established when no fresh rinsing water is being received from the processor, but such that it senses liquid when the device is receiving fresh rinsing water.

It is of advantage that the silver recovery device according to the invention comprises at least two holders with ion exchange resin, which are connected in series so that they operate in cascade relation. This has the advantage that each individual device may operate at its optimum efficiency based on the continuous circulation of the water through its resin bed, and that any occassional clogging of the resin mass of one holder does not render the installation inoperative since the rinsing water will simply fill the clogged holder up to the second outlet opening and then flow to the next holder. This spontaneous by-passing of a defective holder is an important feature of the invention.

The arrangement with the circulation pump means that pumps liquid flowing out through the first outlet opening back to the inlet opening of the resin holder has for consequence that this circulation liquid is added to combined with the liquid being received from the processor and going directly to the inlet of the resin holder. This means that the localized rate of flow of rinsing water through the ion exchange resin holder is larger than the rate of flow of the rinsing water discharged by the processor, and this means a very good yield of the recovery device. It has been shown that a ratio of at least 1.5:1 for the flow rate through the resin to the flow rate from the processor may easily be obtained. Larger flow rate ratios further improve the operation of the apparatus.

BRIEF DESCRIPTION OF THE DRAWINGS

The invention will be described hereinafter by way of example with reference to the accompanying drawings, wherein.

Figure 1:
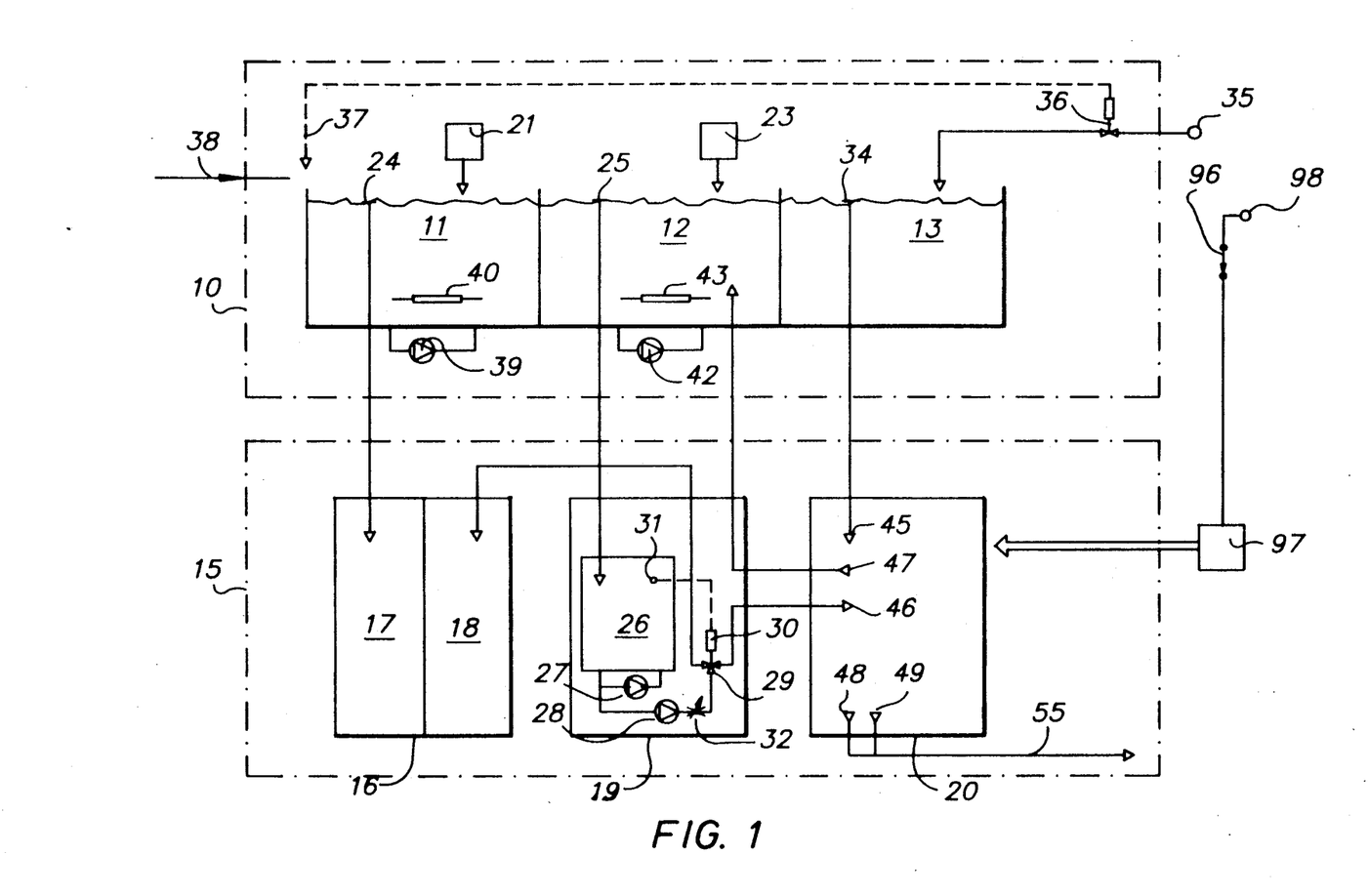
FIG. 1 is a diagrammatic illustration of a photographic film processor and an ecologic processing unit connected therewith.

Referring to FIG. 1, a photographic film processor 10 which comprises a developing station 11, a fixing station 12 and a rinsing or washing station 13, is connected to an ecologic processing unit 15 which comprises a module 16 with a holder 17 for used developer and a holder 18 for used fixer, a module 19 for the recovery of silver from the fixer liquid, and a module 20 for the recovery of silver from the rinsing water.

The processor 10 and the unit 15 have been illustrated as separate units in FIG. 1, and in practice they may be located close to each other or even be arranged in separate rooms. However, the unit 15 may also be integrated with the processor 10. The holders 17 and 18 may be in the form of small tanks, jerrycans, canisters, and the like.

The developing station 11 comprises a replenishing or make-up system 21 for adding replenishing liquid to the station as developer is being consumed by the developed film and dragged into the fixing station. In a similar way, the fixing station 12 comprises a replenishing system 23 for the fixer liquid. The processing stations may be deep tanks with film transport racks, or shallow tanks for a nearly horizontal film transport. The crossover between adjacent tanks may be provided with squeegee roller pairs or the like for limiting the transfer of processing liquid into the next tank, all as known in the art.

The developing station 11 has an overflow 24 which controls the liquid level in the station, and which leads to the holder 17.

A pump 39 maintains a circulation of developing liquid in the station. A heater element 40 controls the temperature of the developer.

The fixing station 12 has an overflow 25 which leads to the electrolytic silver recovery device 26 of the module 19. A first pump 27 ensures the circulation of fixing liquid through the recovery device 26, whereas a second pump 28 pumps the liquid to a three-way valve 29 that normally conducts the liquid back to the fixing station, via the ion-exchange recovery module 20, but that may also conduct the liquid to the holder 18 for used fixer. The valve 29 is controlled by a solenoid 30 in response to the signal from a level sensor 31 in the device 26 so that as the liquid level in the device 26 exceeds a set value, as after the addition of replenishing liquid to the fixing station, the valve is switched to conduct the excess liquid to the holder 18.

A restrictor 32 permits to adjust the rate of flow of fixer liquid to the fixing station.

A pump 42 maintains a circulation of fixer liquid through the fixing station. A heater element 43 controls the temperature of the fixer.

The rinsing station 13 has an overflow 34 which leads towards the module 20. Rinsing water is taken from a tap water connection 35 under the control of a valve 36 which may be controlled by a sensor 37 in response to the introduction of a film 38 into the processor.

The module 20 is described hereinafter in detail with reference to FIG. 2 inlet which the numbering of the liquid in-and outlets 45 through 49 corresponds with that of FIG. 1.

The module 20 comprises a number of liquid tanks, pumps and valves which are mounted within a cabinet which as such need not necessarily be liquid-tight, but which may have a dripping pan 50 for collecting liquid that may leak from a tank upon servicing the tank, and for draining such liquid to the sewer via the conduit 87.

The module 20 comprises a group of three silver recovery tanks 51, 52 and 53, a group of resin regeneration tanks 54, 56 and 57, and a tank 58 with a biocide.

Figure 3:
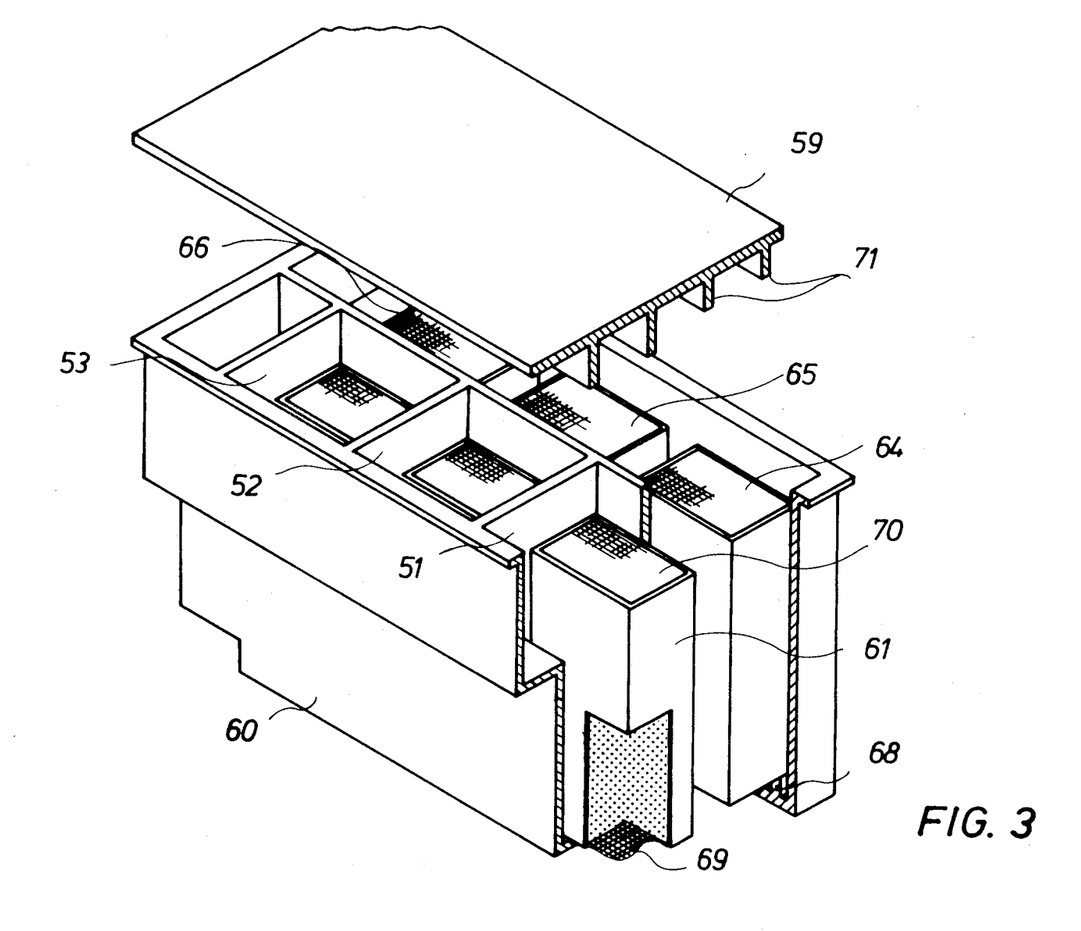
FIG. 3 is a perspective view of one embodiment of a holder with the resin cartridges of the device of FIG. 2.

Tanks 51 through 57 are arranged for holding resin cartridges 61 through 66, and may suitably be formed by six compartments of one holder 60, as illustrated by the partly broken-away perspective drawing of FIG. 3. The in-and outlets have not been illustrated in this figure.

Each cartridge is basically a rectangular holder with a perforate bottom wall 69 and perforate top wall 70, as illustrated for the cartridge 61. The perforate walls may suitably be formed by a net of a plastic fabric, such as nylon, which is heat-sealed to the peripheral rim of the top and bottom opening of the holder. The cartridge is suitably made from a plastic that readily lends itself to ecological disposal, e.g. polyethylene. Each cartridge contains an amount of an ion-exchange resin which is such that sufficient space is left for the liberation and spreading of the resin as the operation of the cartridge is stopped, as will be described in detail hereinafter. Suitable filling ratio of the inner volume of the cartridge are between 60 and 95%. The cartridges can be freely lowered in the tank compartments, and are arranged for being liquid-tightly sealed at their bottom periphery by a rim such as the rim 68 illustrated for the cartridge 64. The cartridges are urged downwardly on the rims by rib sections 71 that are provided at the underside of the cover 59 which liquid-tightly fits to the holder 60.

The liquid circuits of the tanks 51, 52 and 53 constitutes in fact three identical arrangements, and therefore only the circuit of tank 51 will be described hereinafter in detail with reference to FIG. 2.

The tank 51 has a first overflow, formed by an opening 74 in its wall, which is connected via a conduit 75 with the suction end of a centrifugal-type circulation pump 76. The pressure end of the pump is connected via 88 with the inlet opening 78 in the bottom of the tank. The tank has a second overflow formed by an opening 79 which is located slightly higher than the first one, and which forms the outlet of the tank for the cleaned rinsing water.

The pump 76 maintains a continuous circulation of liquid through the tank, the liquid flowing upwardly through the cartridge 61, and back via the overflow opening 74 and the conduit 75.

The conduit 75 which leads to the suction end of the pumps 76 forms the inlet of the circuit, and this conduit is connected via the upper branch of the three-way valve 80 with the inlet 45 which receives water from the overflow 34 of the rinsing station 13 of the processor. As rinse water is received from the rinsing station, the level of the liquid in the recovery tank 51 increases till the level of the second overflow opening 79 is reached. At that moment the rinse water is discharged into the inlet end of the second tank circuit, viz. into the conduit 82, and the water is circulated in the second tank circuit until the level of the second overflow opening of this second circuit is reached, what leads to a discharge into the third recovery tank 53. The process is repeated in this third tank until finally the water is discharged into the conduit 83 which leads to the discharge point 48 which is in connection with the conduit 55 to the sewer.

The purpose of the three-way valve 80 is to bring about the connection between inlet 45 of the recovery device and the sewer via the conduits 85 and 55 during periodic cleaning of the rinsing tank of the processor, so as to prevent servicing products would enter the recovery device and destroying the function of the ion exchanger resin by passing the same directly to the sewer. The conduit 87 connects the pan 50 with the outlet 49, and so also to the sewer.

Each recovery tank may be provided with a pressure sensor such if 89 for measuring the back-pressure produced by the ion-exchange cartridge, and for producing a warning signal as the pressure exceeds a pre-set value, pointing to an unsatisfactory operation of a cartridge. The recovery tanks have drain valves 90, 91 and 92 for draining the tanks in view of their servicing.

The tanks 54, 56 and 57 of the second group form the resin regeneration tanks as mentioned already. The tanks are arranged for receiving the cartridges from the recovery tanks as their efficiency has dropped below a certain value. The liquid flow between the tanks is as indicated by the arrows. The regeneration of the ion-exchange resin of the cartridges occurs in the present example by means of the fixing solution of the processor. It will be understood that the latter technique requires the use of a resin type that lends itself to this way of regeneration. The three regeneration tanks are connected in series with the circuit of the fixer of the processor 10 via the connections 46 and 47. A three-way valve 99 is controlled by a controller 97 in such a way that normally the upper branch of the valve is in the circuit, what means that the ports 46 and 47 are in fact short-circuited, i.e., indirect connection whereby the fixing liquid flows directly from the valve 29 to the fixing station 12.

When time has come to regenerate the resin, the controller 97 connects the lower branch of the valve 99 in the circuit so that now the fixer flows from connection 46 through the regeneration tanks, and then to connection 47. Further, the valve 99 may also be controlled in response to the silver rate or concentration of the fixer circuit, thereby to start the resin regeneration only when the silver rate of the fixer is below a certain value, e.g. below 0.2 g of silver per liter of fixer. Finally, there are valves 93 and 94 for draining the regeneration tanks.

The tank 58 is connected to three identical volumetric displacement pumps 95 for delivering at the appropriate moment a controlled volume of a biocide to the recovery tanks 51, 52 and 53.

The operation of the recovery device 20 is controlled by the controller 97 in the following way.

First, when the film processor 10 is operative as illustrated by the closed switch 96 (see FIG. 1) which is a main switch in the circuit line of the electric supply 98, the controller 97 controls the circulation pumps 76, 67 and 77 to operate uninterruptedly thereby to remove silver from the rinsing water in the respective circuits. The controller 97 also controls the three-way valve 99 to connect the regeneration tanks 54, 56 and 57 to the circuit according to a pre-set time program.

Second, when the processor 10 is inoperative (e.g. at night) i.e. when the switch 96 is opened, the controller 97 controls the pumps 76, 67 and 77 to operate intermittently. The expression intermittent means in the present context that the pumps are made to run and to stop for periods that may have for instance a ratio between 1:1 and 1:10, the minimum absolute value of a running period being some minutes.

Further, the controller 97 controls the operation of the pumps 95 so that a controlled quantity of biocide is fed to the resin cartridges 61, 62 and 63 of the recovery tanks 51, 52 and 53, at a time when the processor is inoperative. In this way it is made sure that the biocide is not prematurely flushed away by new rinsing water received from the rinsing tank 13.

The above description will have made clear the operation of the installation. The behaviour of a cartridge with ion exchange resin is now described in more detail.

A cartridge being filled with resin particles for only about 90% of its volume, it will be understood that the mass of resin is fluidized as the circulation pump of the recovery tank pumps rinse water upwardly through the tank. The resin is urged as a rather compact mass against the perforate top wall of the cartridge. The rise of the resin by the operation of the pump occurs within a few seconds.

This situation continues during the whole operative period of the processor.

When the film processor becomes inoperative, for instance at night as mentioned already, the pumps of the recovery tanks are operated intermittently.

As a circulation pump is halted, the force which raises the resin mass in a cartridge disappears. The volume occupied by the resin mass expands from its compacted state in downward direction under the influence of gravity. The lower portion of the resin mass becomes detached from the remaining mass and sinks slowly onto the bottom net of the cartridge, in the form of isolated particles which freely whirl in the liquid. This phenomenon proceeds gradually and the lower portion of the resin mass will have reached the bottom of the cartridge already before the upper portion looses contact with the top of the cartridge. In the meantime, the resin fills the complete volume of the cartridge as a disclocated mass. Eventually, the resin becomes a compact mass again, this time resting on the lower perforate wall of the cartridge.

The described operation is very effective to set free gelatin of the processed films that has become deposited on the resin and that increases the resistance to liquid flow.

Although the described operation did not physically remove the gelatin as such from the water, it has been found that the next operation of the pumps produces less back pressure than the one which occurred just prior to the rest period.

Restarting the pumps drives the resin mass within a few seconds upwardly in the cartridge, thereby to operate as a fluidized bed. The removed gelatin is circulated with the water and will slowly start to settle again on the resin. This settlement is less than that which occurred during the operation of the processor, since said operation continued for several hours, whereas the operation of the pumps intermittently during the inactive period of the processor covers much smaller periods, which may range between some minutes and some tens of minutes.

As the processor is restarted and film becomes processed, fresh rinse water is added to the rinsing tank in response to actuation of the switch 37. The corresponding volume of used rinsing water which flows via the overflow 34 to the recovery device, causes a corresponding volume of gelatin-loaded water circulating in the device to be drained off to the sewer.

It has been shown that the described way of processing can continue for several months without substantially reducing the resistance to liquid flow of the cartridges. It is clear that an accidental clogging of a cartridge may always occur, as mentioned already hereinbefore, but this has the mere consequence that water in the concerned recovery tank passes over rather than through the cartridge.

The efficiency of the tanks in removing silver decreases in direct proportion to the percentage of resin capacity utilized. For this reason the device is normally operated until typically 100% of the resin efficiency of the first tank, 95% of the second and 50% of the third tank have been utilized. This operation period may occupy several months. Then the device is arrested, and the cartridges from recovery tanks 51, 52 and 53 are transferred to the regeneration tanks 54, 56 and 57 and the regenerated cartridges from the latter group of tanks are transferred to the first group. This way of interchanging can be repeated up to 50 times, depending on the characteristics of the resin.

It will be understood that the final silver recovery occurs in the device 26 which electrolytically removes the silver from the fixing solution, and thus also from the resin which was regenerated by such fixing solution.

The following data illustrate by way of example the installation described hereinbefore.

| | |
|---|---|
| Volume of tanks 51, 52, 53, 54, 56 and 57: | 3.5 dm$^3$ |
| Volume of each cartridge 60: | 3.0 dm$^3$ |
| Volume of resin in each cartridge: | 2.5 dm$^3$ |
| Height difference between overflow openings 74 and 79: | 1 cm |
| Rate of pumps 66, 67 and 77: | 20 to 30 l.min$^{-1}$ |
| Rate of liquid through the cartridges: | 13 to 15 l.min$^{-1}$ |
| Rate adjusted by the restrictor 32: | max. 2 l.min$^{-1}$ |
| Rate of intermittent operation of the recovery tanks at night: | on: 5 min. off: between 10 and 20 min. |
| Rate of regeneration: | every month during 4 to 5 h |
| Max. rate of flow of rinsing water from the processor: | 8 l.min$^{-1}$ |
| Silver effluent discharge: | less than 0.5 mg Ag per liter of water |

Resin used: LEWATIT, type M500 MB, manufactured by BAYER AG, Germany
Cartridges: made from high-density polyethylene.
Perforate bottom and top walls: nets of polypropylene fabric.

Figure 4:
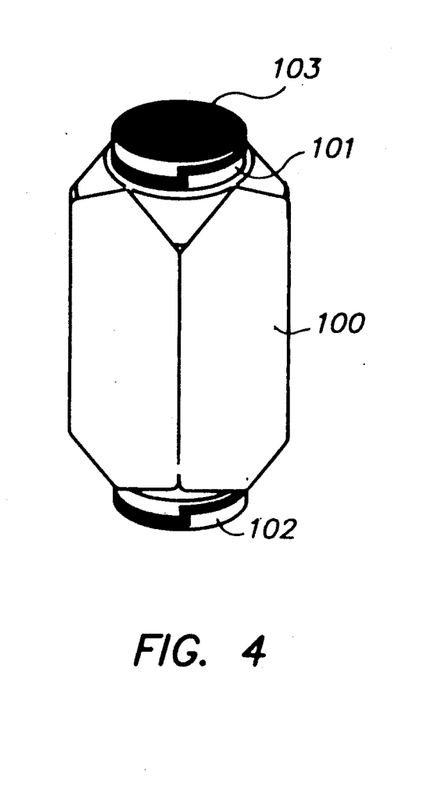
FIG. 4 is a perspective view of one embodiment of a resin cartridge.

Another embodiment of an ion-exchange cartridge is illustrated in FIG. 4. The cartridge is a generally square body 100 with threaded neck portions 101, 102 resp. at the top and the bottom.

The bottom opening being closed by a suitable net (not visible in the drawing), the cartridge is filled for a given volume percentage with resin particles and then also the top opening is closed by a net, see 103. The cartridge is delivered to the customer with two screw caps for closing the cartridge when it is removed from the device at the time it can no longer be regenerated. The cartridge forms then a liquid-tight receptacle which can readily be handled for its transport to an ecological disposal station.

It has been shown that it may be advantageous to distribute a number of small cage-like members in the mass of resin beads. Suchlike members are used in the treatment of effluent water. In a typical form such members may have a length and a width of approximately 3 cm, and comprise ribs, fins or the like interconnected to an open structure, made of an inert material such as high density polyethylene. These cages form obstacles in the path of the resin beads moving upward and downward in the cartridge in dependence on the starting and stopping of the pumps, and thereby they have an extra dislocating and spreading effect on the resin beads.

Figure 5:
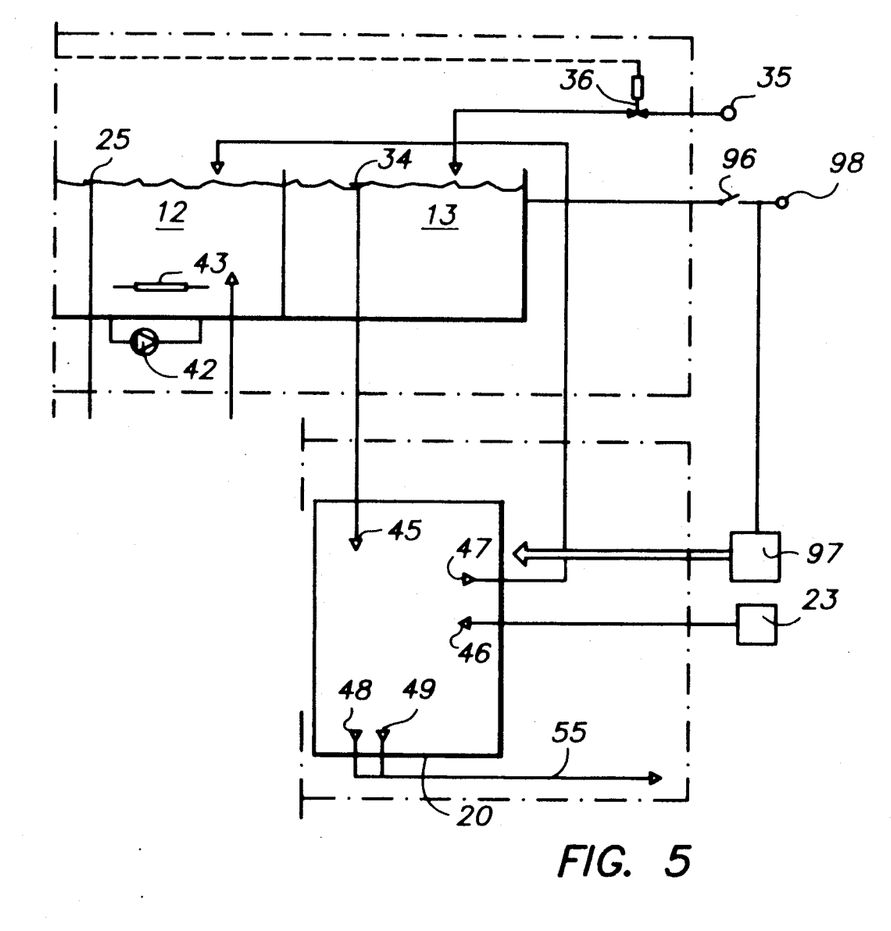
FIG. 5 illustrates a different regeneration circuit for the embodiment of FIG. 2.

FIG. 5 illustrates another circuit for the regeneration of the ion-exchange resin.

The figure is based on the drawing of FIG. 1, but shows only those elements that are essential for illustrating the different operation.

Figure 2:
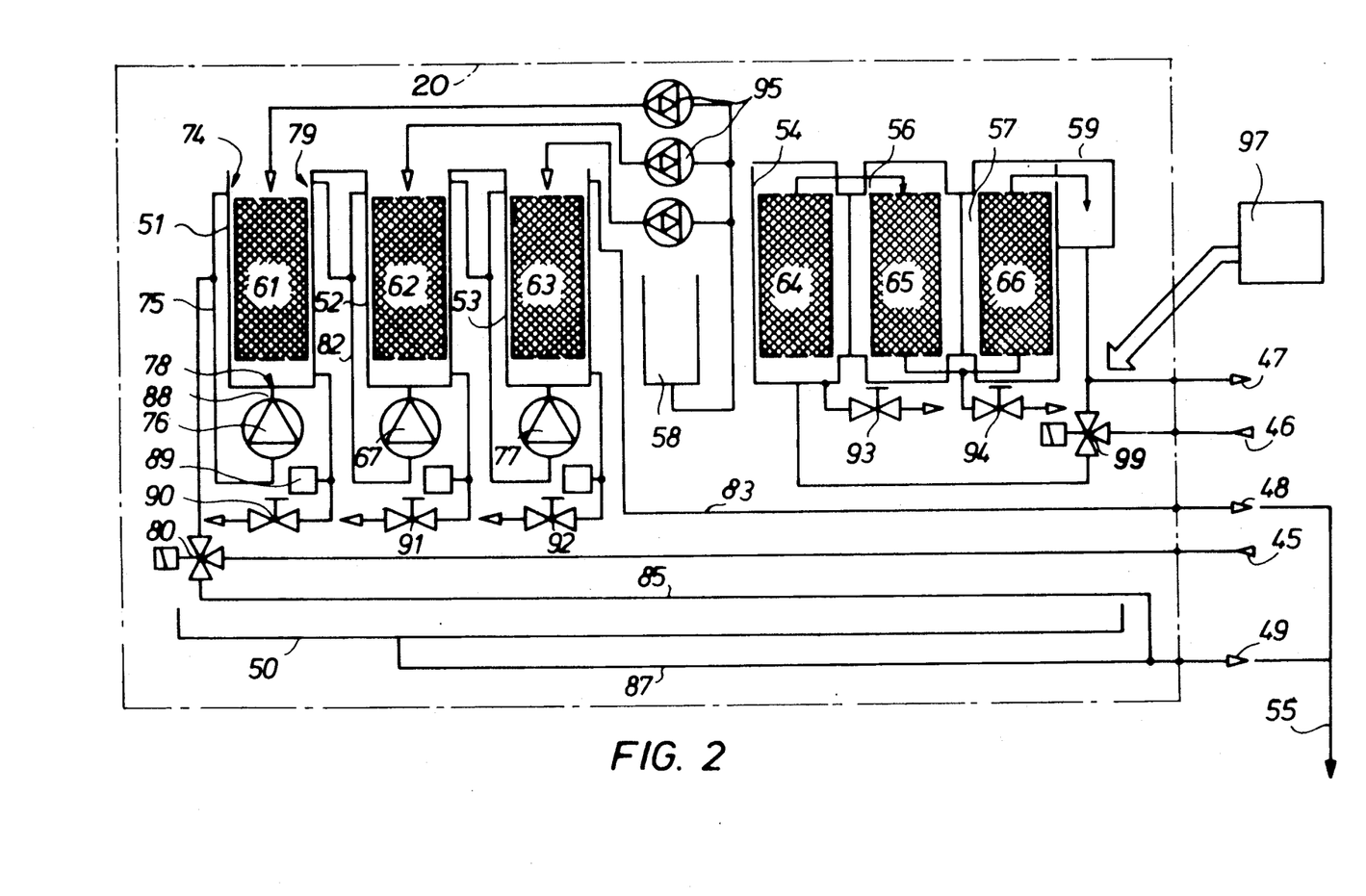
FIG. 2 is a diagrammatic representation of one embodiment of the device of the ecologic processing unit for recovering silver from the rinsing water of the processor.

The fixer for the regeneration of the ion-exchange resin is no longer taken from the silver recovery module 19, but instead now the fixer which is added by the rejuvenation device 23 to the fixing tank 12 is now passed through the cartridges 64, 65 and 66 to be regenerated, via the connections 46 and 47, see also FIG. 2. The valve 99 may remain always open so that fresh rejuvenation fixer is always passed through the regeneration circuit.

When the interchanging of the cartridges is done as described hereinbefore, it may happen that the silver content of the rejuvenation fixer that is passed through the cartridges laden with silver, becomes too high for a satisfactory fixing of the developed film, in particular at the starting of the regeneration when the highest amount of silver is removed from the resin. In such case, it may be interesting to operate the valve 99 in such a way that periods of indirect supply of rejuvenating fixer to the fixer tank, i.e. the rejuvenating fixer being passed through the cartridges in the regeneration tanks, alternate with periods of direct supply, i.e. as illustrated in FIG. 1.

Alternative arrangements of the embodiment described hereinbefore are as follows.

The silver recovery device may be connected to a processor in such a way that cleaned rinsing water is returned to the rinsing station of the processor. In case the quality of the cleaned rinsing water would not be appropriate for direct use as rinse water, a combination of fresh tap water with cleaned rinsing water may be considered.

The regeneration of the used resin need not necessarily occur on-line by means of the fixer liquid taken from the processor, but may also be done off-line by means of an extra, separate fixer supply, or by the use of appropriate products, as prescribed by the manufacturer of a given type of resin.

The number of resin cartridges may be higher or lower, and two or more cartridges or groups of cartridges may be used in parallel.

The intermittent operation of the circulation pumps of the silver recovery tanks is not limited to the inoperative period of the processor. As a matter of fact, it may be considered to introduce rest periods for the pumps also during the operative period of the processor, in order to provide a further opportunity for the ion exchange resin to get rid of deposited gelatin. Such rest periods will preferably occur under the control of a sensor that senses the absence of a photographic film in the processor, such as the sensor 37 described hereinbefore since otherwise rinse water could be received from the processor which would not pass through the recovery device but which would flow directly to the sewer.

Figure 6:
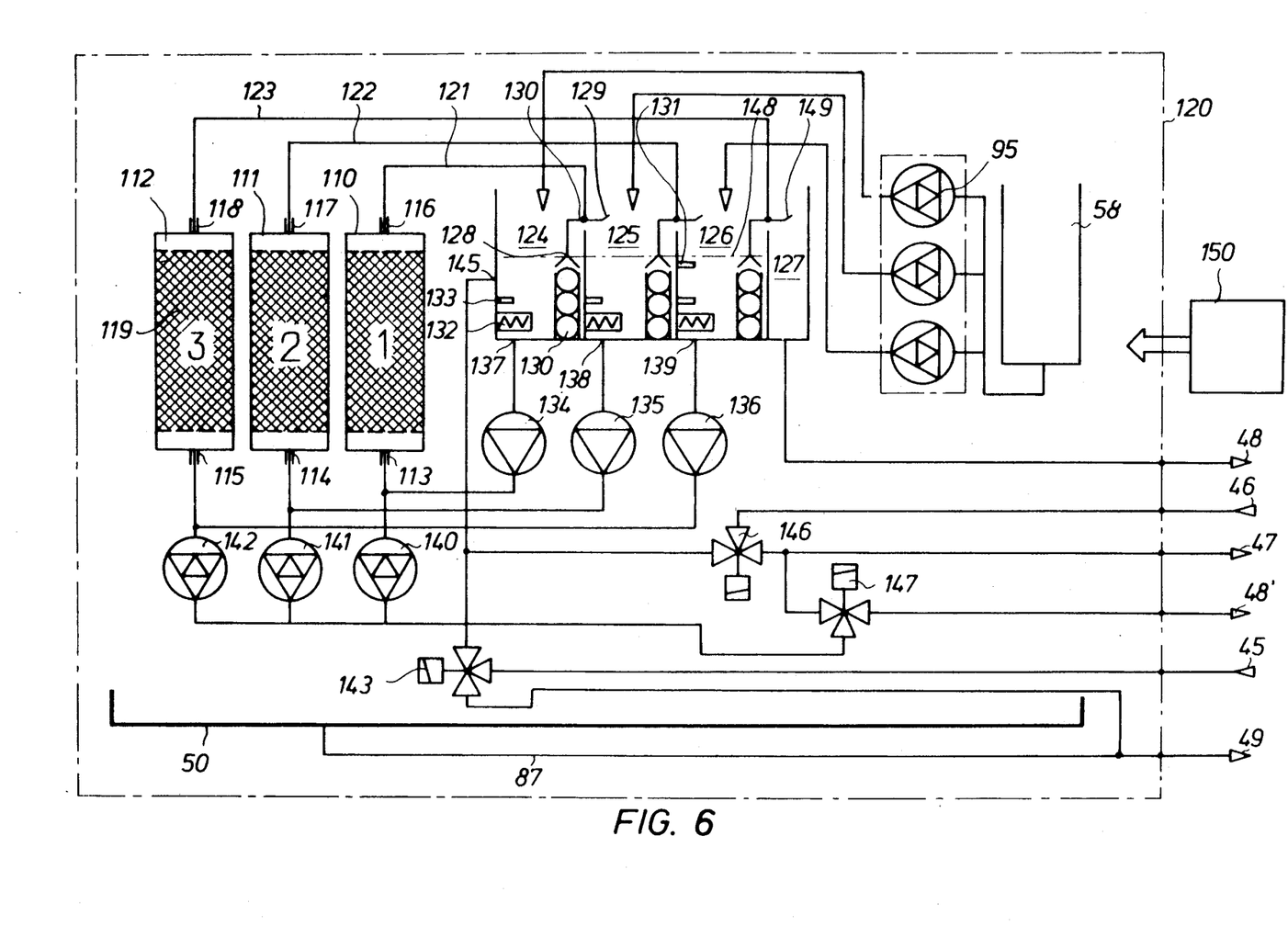
FIG. 6 is a diagrammatic representation of another embodiment of the device of the ecologic processing unit for recovering silver from the rinsing water of the processor according to FIG. 1.

Another embodiment of an ecologically advantageous processing unit according to the invention for use with the photographic film processor according to FIG. 1 is illustrated inlet FIG. 6 in which the in- and outlets that correspond with those of FIGS. 1 and 2 have the same numerals.

The important distinction between the latter embodiment and the one according to FIG. 2 is that the regeneration of the cartridges with the ion exchanger resin in the FIG. 2 embodiment requires the removal of the cartridges from the silver recovery holders 51, 52 and 53 and their location in the resin regeneration holders 54, 56 and 57, whereas in the FIG. 6 arrangement the resin is contained in holders that constitute a permanent container or pack for the resin that remains manifolded in the liquid circuit until the resin has become useless.

Referring to FIG. 6, the silver recovery module 120 comprises three resin holders 110, 111 and 112 in the form of plastic packs that have an inlet nipple 113, 114 and 115 at the bottom and an outlet nipple 116, 117 and 118 at the top permitting easy connection of the packs into and removal from the circuit of the module, e.g. by means of hoses that are slid over the corresponding inlet and outlet nipples of the packs. The packs contain a mass of ion exchange resin 119 that is kept within a perforate bottom and top wall, which may suitably be formed by a net.

The packs are in communication with three corresponding control holders 124, 125 and 126 through conduits 121, 122 and 123. These holders may be formed as one open tank which has partition walls to determine the mentioned holders, as well as an outflow compartment 127.

Each control holder has two outlet openings at different levels, the function of which corresponds to that of the two outlet openings 74 and 79 of the holders 51, 52 and 53 illustrated in FIG. 2.

The outlet openings have been numbered for the control holder 124 only, viz. 128 and 129, and they are identical for the holders 125 and 126.

The opening 128 is in fact the lower end of an L-like pipe 130 that connects to the conduit 121, the upper end of said pipe being slightly upwardly angled and constituting the opening 129.

Each of the three control holders has further the following provisions.

A series of balls 130 that are urged upwardly in a guide column by the liquid and that close the opening 128 as the liquid reaches the level 148 of said opening.

A level sensor 131 that senses a liquid level that is about 10 mm below the level 148.

And finally, a heater 132 for heating the liquid in the holder, under the control of a temperature sensor 133.

The module 120 comprises further three circulation pumps 134, 135 and 136 for pumping liquid from bottom openings 137, 138 and 139 of the control holders to a corresponding resin pack, and also three volumetric pumps 140, 141 and 142 also connected to the bottom of the holder for withdrawing liquid from the resin packs.

The pumps 134-136 permit the flow of liquid therethrough when in an inactive state to supply eg. liquid to the intake side of pumps 140-142. Pumps 140-142, however, being volumetric, block the flow of liquid therethrough when in an inactive state. Thus, pumps 140-142 are effective to withdraw liquid from the control holders despite pumps 134-136 being in an inactive state while pumps 140-142 are effective to block he passage therebeyond of liquid being pumped by pumps 134-135 when active.

Further, there are the following three-way valves. A three-way valve 143 for connecting the rinse water inlet 45 either to the port 145, which is in fact the inlet of the ion exchange resin silver recovery, unit or to the sewer via the outlet 49.

A three-way valve 146 for connecting the inlet connection 46 for the fixer liquid from the film processor to the same inlet port 145, or directly back to the outlet 47.

Finally, a three-way valve 147 for connecting the outlets of the pumps 140 to 142 to the fixer outlet 47, or to an additional outlet 48' the purpose of which will be explained hereinafter.

The device comprises also a tank 58 for a biocide, and volumetric pumps 95 for pumping this biocide to the control holders.

The operation of the device is as follows.

The photographic processor 10 being operative, and the module 120 being connected to said processor through the corresponding connections 45 to 49, used rinse water that is discharged through the overflow 34 of the tank 13 enters the module at 45 and flows via the valve 143 to the inlet 145 of control holder 124.

The circulation pump 134 draws water from the holder and pumps it through the first resin pack 110. The water returns to the holder 124 via conduit 121, pipe 130 and opening 128. This goes on, and silver becomes gradually removed from the water by the ion exchange resin of the first pack, until the supply of water is such that a level is reached at which the balls 130 close the opening 128. At that moment the liquid starts to flow through the opening 129 of pipe 130, and starts to fill the second silver exchange circuit comprising control holder 125, pump 135 and resin pack 111. In the meantime, the process in the first circuit continues. Still further supply of used rinse water causes also the third resin circuit with control holder 126, pump 136 and pack 112 to become involved in the liquid circulation. As the level of the water in the third control holder 126 exceeds the level of the opening 128, water flows through outlet 149 in the outflow compartment 127, and so to the sewer via outlet 48.

When the operative period of the photographic processor 10 comes to an end, e.g. in the evening, the module 120 receives no further water from the overflow 34, but the operation of the pumps 134, 135 and 136 continues in order to remove the silver from the water already contained in the circuit of the module.

However, during at least part of the inoperative period of the processor, the pumps 134, 135 and 136 are controlled to operate intermittently. Shut down of these pumps causes the fluidized beds of the three resin packs slowly to disintegrate, under the influence of gravity as described hereinbefore with reference to the cartridges 61, 62 and 63 shown in FIG. 2. In the present embodiment, good results have been obtained with an intermittent operation during a 4 hours, namely period alternatingly 10 min operation and 10 min rest.

The module 120 comprises electronic control means 150 for performing the following controls during the inactive period of the photographic processor.

First, prior to the shut down of the circulation pumps 134, 135 and 136, the volumetric pumps 140, 141 and 142 are activated to operate until the liquid level in the control holders has lowered from the level of the openings 128 to the level detected by the sensor 131, which is approximately 1 cm lower as said already. Water withdrawn by the pumps 140, 141 and 142 is delivered via the valve 147 to the outlet 48' and so to the sewer.

Then the pumps 95 are operated to add biocide to the control holders in such an amount that the level 128 is not reached. Also, heaters 132 of the control holders may be connected in the circuit so that under the control of the sensors 134 the temperature of the liquid is raised in order to facilitate the removal of gelatin from the resin packs. In the present example satisfactory results have been obtained with a temperature of 45° C.

Then the pumps 134, 135 and 136 are restarted, according to an intermittent cycle as described, for a preset number of hours, e.g. 4 hours.

The intermittent operation of these pumps is followed by a continuous operation which makes the module ready for a next operation of the photographic processor.

Figure 7:
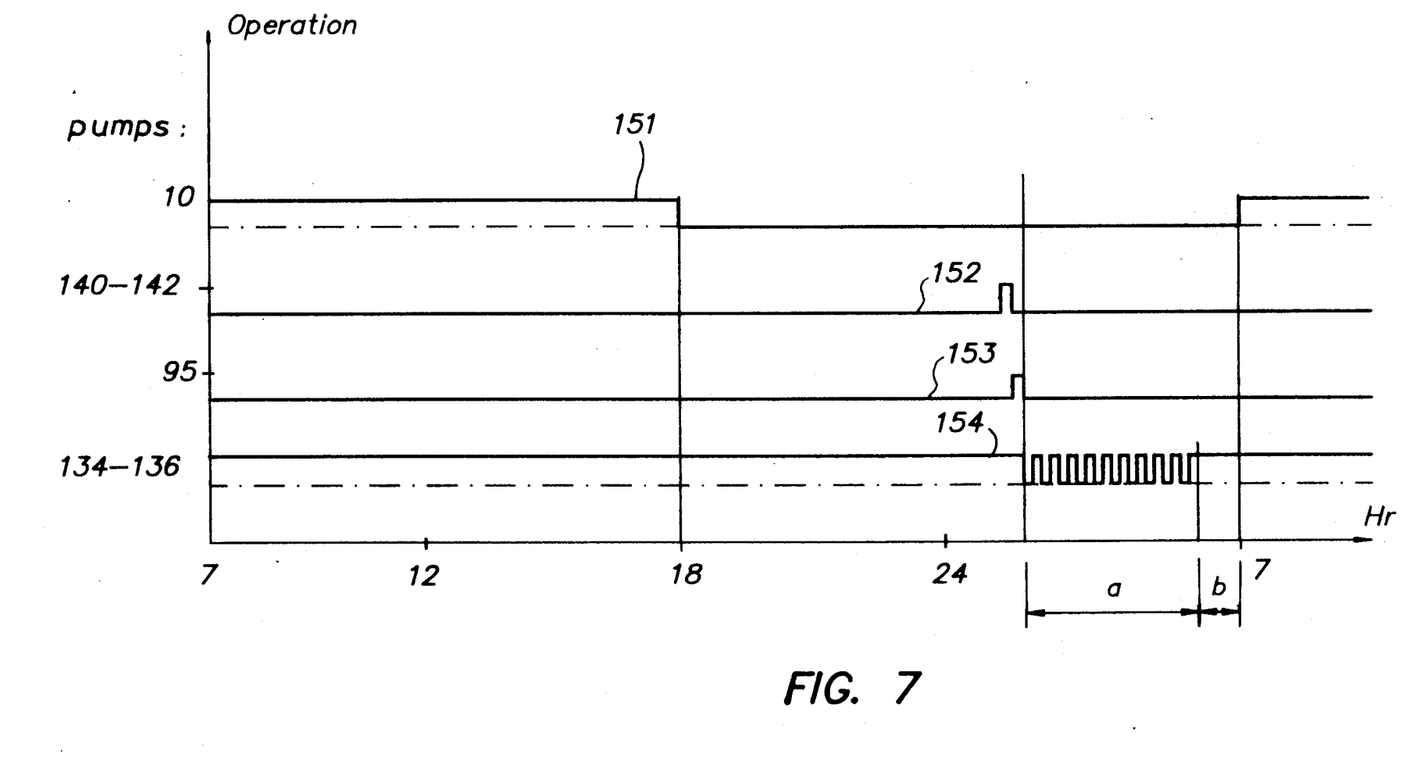
FIG. 7 is a time diagram which illustrates different functions of the device according to FIG. 6.

The diagrammatic illustration of FIG. 7 gives an indication of the operation of the silver recovery device for a given 24 hrs cycle during which the photographic processor is operative from 07 to 18 hrs. The curve 151 illustrates the operation of the photographic processor, the curve 152 the operation of the volumetric emptying pumps 140 to 142, the curve 153 the operation of the biocide pumps 95, and the curve 154 shows the operation of the circulation pumps 134 to 136.

The time period a is the 4 hours intermittent operation of the circulation pumps, whereas the period b stands for an uninterrupted one to two hours continuous operation in preparation of the restarting of the processor.

The following measures can be taken in order to further control the resin packs during the inoperative period of the photographic processor.

If the processor does not start to operate within one to two hours after the intermittent operation of the resin packs, the heating circuits 132 are disconnected from the circuit to save energy.

If the processor does not start to operate within 24 hours after the intermittent operation of the pumps 134, 135 and 136, the whole cycle of slightly lowering the liquid levels, adding biocide, and increasing the temperature of the liquid may be repeated in order to keep algae growth under control.

The regeneration of the resin packs proceeds as follows.

Valve 143 is switched to conduct water that should occasionally arrive from the processor input at 45, directly to the sewer via outlet Pumps 140, 141 and 142 are operated for a time sufficient to evacuate all the water of the circuit to the sewer via outlet 48'.

Valve 146 is then switched to conduct fixer that is available at the inlet connection 46 to the inlet 145. Fixing liquid fills in succession the first, second and third control holder, the pumps 134, 135 and 136 being operative, until the level of sensor 131 is reached which causes the valve 146 to resume the rest position whereby no further fixer is added to the circuit but connections 46 and 47 are directly interconnected to each other. In this way it is prevented that fixer would finally flow into compartment 127 and so to the sewer.

The regeneration of the resin can go on for a pre-set number of hours which have been predetermined to produce under all circumstances a complete regeneration of the resin. This method, however, has the disadvantage that in case of limited use of the photographic processor over a certain period, the regeneration time of the resin is unnecessarily long or, conversely, the initiation of regeneration is unduly premature. Therefore, according to a preferred embodiment of the invention, there is performed an integration in time of the electric current supplied electrolytic the silver recovery device 26 of the module 19 which is caused by silver which has been removed from the ion exchange resin by the fixer, and which in its turn is being removed from the fixer by the electrolytic recovery unit silver 26. Such integration gives an exact indication of the amount of silver which has been recovered to the installation, i.e. of the amount of film which has been processed.

This information may be used to set initiate of regeneration, rather than determining the same on the basis of a preset lapse of time.

In the present example, the size of the resin packs was such that a "normal" period of use of the processor, e.g. two months, could be expected for a regeneration period of 8 hours (which thus could occur at night). However, periods of lesser activity may well give rise to periods considerably longer than 2 months before regeneration is needed, and in such case an inbuilt microprocessor may signal to the operator that the deadline for the next regeneration will probably be so much time later.

Be that as it may, when the regeneration is finished, the pumps 134, 135 and 136 are stopped, the pumps 140, 141 and 142 are made to operate for a certain period and the valves 147 and 146 are switched so that fixer withdrawn from the system is returned via outlet 47 to the fixer circuit of the processor. Then the pumps 140, 141 and 142 are stopped and the valve 147 is put in its rest position, i.e. leading towards the outlet 48'.

It will be understood that the described device may comprise in practice still other sensors that are desirable for signalling anomalous operation conditions, e.g. level sensors in the control holders for signalling a level in excess of the partition walls, an "empty" sensor in the tank for the biocide, etc. These, and still other measures in connection with liquid circuits belong to the state of the art and are therefore not further dealt with hereinafter.

Alternative embodiments of the described device are as follows.

The intermittent operation of the pumps 134, 135 and 136 may be switched into a continuous one if the photographic processing apparatus is used during the intermittent operation of these pumps. Thus, if rinse water is received from the overflow 34 of the photographic processing apparatus (what indicates to the operation of said apparatus), has resumed the level of the liquid in the control holder 126 increases until the level of the detector 131 is reached. This detector switches the intermittent operation of the pumps into a continuous one, so that the rinse water does not flow directly to the sewer, but instead is pumped through the ion exchange resin packs to remove the silver therefrom before the water flows into the compartment 127.

The outlet connection 48' need not necessarily lead to the sewer but may be connected to a recirculation system for the rinse water.

The pumps 134, 135 and 136 need not necessarily operate in parallel during their intermittent functioning. Thus, two pumps, e.g. 134 and 135 may be periodically arrested in view of the setting free of the ion exchange resin of the packs 110 and 111, whereas the third pump 136 may go on, thereby keeping the processing apparatus in a stand-by condition for limited operation during its inoperative period.

In the embodiments described hereinbefore, of an occasional clogging of an ion-exchange cartridge can be signalled by means of a pressure sensor mounted on the pressure side of the circulation pumps. It may occur that the pressure differences between system which is still operative and one which is no longer so are small and thereby difficult to detect.

Therefore, there is described hereinafter with reference to FIGS. 8 and 9 an embodiment of a device according to the invention in which the detection of a defective cartridge is based on a liquid level measurement, which on its turn is dependent on a judicious co-operation of liquid distribution means with liquid flow restrictors in two communicating liquid compartments.

Figure 8:
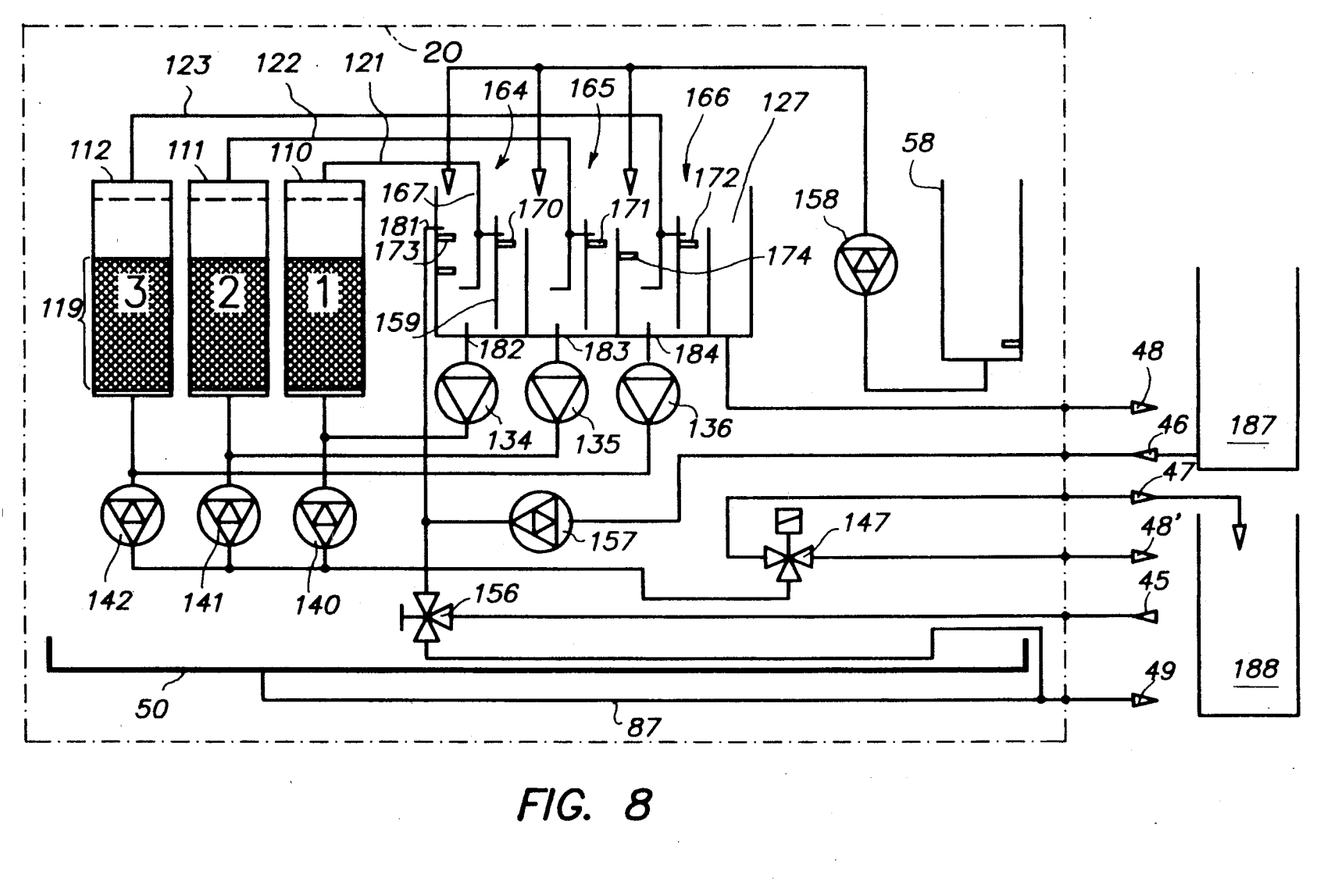
FIG. 8 is a diagrammatic representation of still another embodiment of the inventive device.
Figure 9:
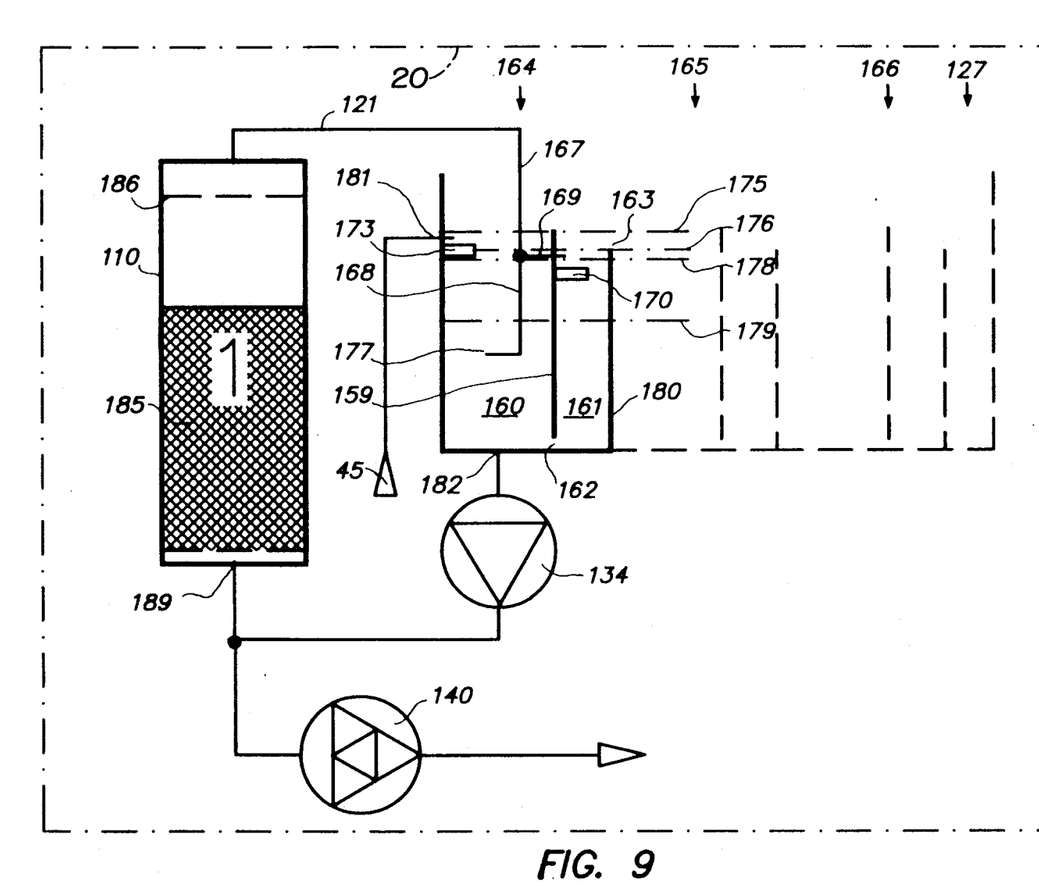
FIG. 9 is a detail view of the circuit of one control holder of FIG. 8.

The elements in FIGS. 8 and 9 which are common to the embodiment of FIG. 6 have the same reference numerals. Further, the FIG. 8 embodiment is a so-called "stand-alone" unit which means in the present case that the liquid, in the present case a fixer solution, which is used for regeneration of the ion-exchange resin is not taken from the film processor but instead from a separate tank provided for that purpose. Also there is provided a second tank for receiving the fixer liquid from the unit after it has regenerated the resin. The unit which now will be described is particularly usefull for smaller customers who have only one processor in operation which, moreover, may be under-operated. It may be cheaper for such client to use an ion-exchanger for reducing the silver content of the rinse water that flows to the sewer and to let the silver recovery treatment of the used fixer take place elsewhere, instead of using an ion-exchanger in combination with a silver recovering for recuperating the silver from the fixer on-line.

The new elements in the FIG. 8 embodiment are as follows.

The manually operated three-way valve 156.

The volumetric pump 157 (which replaces the former three-way valve 146).

The volumetric pump 158 for the biocide, which replaces the former three pumps 95.

And finally, the three control holders 164, 165 and 166 which replace the former holders 124, 125 and 126.

The three holders 164, 165 and 166 have an identical construction and comprise each a partition wall such as 159 shown for holder 164 (see also FIG. 9) which defines a larger compartment 160 and a smaller compartment 161 in the holder. A suitable ratio of the volumes of both compartments is 3 to 1. The partition wall has at its bottom a small opening 162 which establishes a fluid communication between both compartments. The rear wall 180 of the compartment 161 has an overflow edge 163. The rear wall of the first control holder constitutes the front wall of the next one, and so on.

Each resin holder 110, 111 and 112 is in connection with a corresponding control holder via conduits 121, 122 and 123, the conduits each ending in an outlet pipe 167 as shown for the holder 164, which has a first and a second branch, resp. 168 and 169 (see FIG. 9).

The branch 168 extends vertically downwardly over more than half the depth of the holder and ends in a section angled 90 degrees and ending with opening 177.

The branch 169 is in fact the horizontal extension of a T-section and passes liquid-tightly through the partition wall 159.

The second compartments of the three holders have liquid level sensors 170, 171 and 172 mounted at the same level. The first compartment of the first holder further has a liquid sensor 173 mounted at a level between that of the described ones and that of the entrance 181 for the rinse water received via inlet 45 from the processor. The last compartment has a liquid sensor 174 mounted at about two thirds of the level of sensor 172. The liquid sensors described hereinbefore may be so-called capacitive proximity sensors which sense the presence of liquid at a distance of some millimeters from their sensing head.

The device comprises also a microprocessor, not illustrated, which controls the operation of the device, and which may have been programmed to signal to the client the need for regeneration of the resin cartridges on the basis of the type of photographic processor in use and of a predetermined amount of processed film.

Finally there are illustrated in FIG. 9 four different levels 175, 176, 178 and 179 of liquid in the tank, which will be referred to in the following description of the operation of the device.

As a film is processed, rinse water is received at the inlet 181 of the ion exchange device 20 and flows in the first control holder 164. The water leaves the control holder through the outlet 182 of compartment 160 and is pumped by circulation pump 134 into the cartridge 110 with the ion exchange resin 185 via the opening 189. It will be understood that in operation the mass of ion exchange resin does not take a downward position as shown, but rather is urged upwardly until its topside is in contact with the pervious wall 186 of the cartridge 110. Rinse water that leaves the cartridge flows through conduit 121 and pipe 167 to the control holder 164. Although the cross-sections of the branches 168 and 169 are equal to each other, the main part of the liquid will be discharged in compartment 161 and a minor part in compartment 160 since the flow resistance of branch 168 is larger than that of the branch 169 because of the larger back-pressure at the outlet 177 of 168 caused by the linger water column on it. The rinse liquid which has been added to the system overflows the edge 163 and enters the adjacent control holder 165 from which the liquid is withdrawn to circulate through the cartridge 111. This process is repeated for the third control holder and corresponding ion-exchange cartridge, and finally an amount of liquid which corresponds with the amount added at 181 is discharged in the compartment 127 from whence it flows to the sewer.

It should be understood that the "first outlet opening" mentioned in the statement of invention is formed in the present arrangement by the opening 177 of the branch 168 whereas the "second outlet opening" is formed by the overflow edge 163 which in practice may be a cut-away portion or weir in the rear wall 180 which on itself may reach as high as the front wall of the control holder.

In operation of the device, it has been shown that the level of the liquid in the holders may vary between the levels 175 and 176. The level 176 is that which is determined theoretically by the overflow edge 163, and it is clear that this is the lowest operative level. The level 175 results from an addition of liquid to the system which occurs when the film processor starts to discharge rinse water upon the addition of fresh water under the control of a sensor which senses the presence of a film to be processed. The difference between both levels depends on the rate of rinse water; it varied between 2 and 40 mm in the present device, and it will be understood that this difference becomes smaller for the downstream control holders 165 and 166 of the device.

The flow rate of rinse water through the resin holders amounted to approximately 13 l. min$^{-1}$. This supply could undergo slight variations in dependence on the condition of the resin. The flow rate of the water from the processor was maximum 8 l. min$^{-1}$ so that at rate ratio of at least 13:8, i.e. larger than 1.6 was obtained.

The intermittent pumping of the circulation pumps 134 to 136 differs in the present device from that of the embodiment of FIG. 6. As a matter of fact, the control of the present device is such that, if during a certain period, which may vary between for instance 5 and 15 minutes, the device did not receive rinsing water from the film processor, the intermittent operation is started whereby the ion-exchange resin gets the opportunity to sink to the bottom of the cartridges and set free deposited gelatin, as described already hereinbefore.

The initiation of the intermittent operation is signalled as follows.

No further rinsing water being received from the processor, the pump 134 continues to withdraw liquid from control holder 164 via opening 182, and said liquid is returned to said holder via the conduit 121. However, as mentioned already, the back pressure at branch 169 is smaller than at the outlet 177 of branch 168 so that more liquid is discharged in compartment 161 than in compartment 160. Since the cross sectional area of the bottom opening 162 is smaller than that of the branch 169, for instance in a proportion of at least 1 to 3, the liquid in compartment 161 is re-circulated through opening 162 to compartment 160 at a rate which is smaller than the rate of supply so that liquid is still discharged over the overflow edge 163 although in fact new liquid has been added to the system. The mentioned overflowing of liquid continues until a new equilibrium has been obtained which is at the level 178 obtained after shutdown of the circulation pump. As a matter of fact, once this level has been obtained it is shown that no further liquid is discharged to the next control holder.

The consequence of the level 178 is that the sensor 173 "sees" no longer liquid so that it is ready for signalling a new supply of rinse water from the processor that enters through inlet 181 and that flows over the sensor.

The time for intermittent operation being established as described, the intermittent operation is started by the operation of pumps 140 to 142 which withdraw liquid from the several control holders and pump it to the sewer via valve 147 and outlet 48' until the level 179, under the control of sensor 174, has been obtained.

After a certain rest period, e.g. 15 minutes, the circulation pumps 134 to 136 are restarted to maintain a circulation of liquid during a certain time, e.g. 10 minutes.

The restarting of the pumps 134 to 136 causes the respective ion-exchange resin masses to move upwardly in their cartridge. This upward movement occurs rather quickly and the effect caused thereby can be compared with that of a piston moving upwardly in a cylinder and displacing thereby a rather large amount of liquid in a rather short time. This liquid flows for a lesser part in compartment 160 and for a larger part in compartment 161. However, the ratio between both rates is now less than the ratio at the liquid level 178 because now the back-pressure at opening 177 is less. Further, the reduced level 179 has the consequence that liquid which streams out of the branch 169 now no longer produces an overflow over the edge 163.

If for one reason or another a resin cartridge becomes clogged or defective during the intermittent operation whereby no longer water is discharged by the branch 169, this absence of water is noticed by the sensor 170 which may operate a warning signal for examination of the liquid circuit.

The described intermittent pumping continues until the sensor 173 signals the arrival again of new rinse water from the processor at entry 181. This signal controls the circulation pumps 134 to 136 to stop their intermittent operation, and to operate continuously until the next inactive period of the processor of e.g. 15 minutes has been detected, whereafter the intermittent operation can restart.

If the input sensor 173 signals no new rinse water during a longer period, for instance during at least 5 hours, this can be taken as an indication that the processor will be out of use for still another number of hours such as at night, which means that the time has come to add biocide to the circuit in order to keep algae growth under control.

Volumetric pumps 140 to 142 are operated to withdraw an amount of liquid from the circuit until level 179 is obtained (under the control of sensor 174), and next volumetric pump 158 is operated for a preset time period to supply the circuit of each control holder with a pre-determined amount of biocide. In the present embodiment, the outlet ends of the three supply conduits were provided with calibrated nozzles so that in spite of the use of only one pump 158, it could be ensured that each circuit received the same amount of biocide within narrow tolerances.

Another way of determining the opportunity of adding biocide may be based on a statistic approach. Thus the behaviour of the processor may be recorded during several days in order to find out what is/are the longest rest period(s), and this information may control the addition of the biocide.

Once the moment for regeneration of a resin cartridge has come, the client manually switches the valve 156 so that any rinse water received from the processor at input 45 now is directly conducted to the sewer via outlet 49. The pumps 140 to 142 are operated for a time that is sufficiently long to evacuate all the water from the device via the valve 147 and the outlet 48'. Then pump 157 is operated to fill the three circuits with fresh fixer from a supply tank 185 until the sensor 174 senses the level 179. This level applies only for the third control holder 166, since it will be understood that the first and second control holder will have been completely filled in succession until finally the fixer flows over the overflow edge of the rear wall of holder 165 into the holder 166. This reduced level of fixer circulating in the control holders is desirable to avoid at all costs any possible discharge of fixer to the sewer via the end compartment 127, subsequent to the re-starting of the pumps 134 to 136 which may cause a sudden and relatively large discharge of fixer at the inlet branches such as 169, as described hereinbefore with reference to the intermittent operation of said pump and the related "piston" action.

After a certain period, e.g. between 15 and 30 minutes, the fixer may be removed from the device by pumps 140 to 142 and fed via three-way valve 147 and outlet 47 to a collector tank 186.

The operation of fixer-regeneration may be repeated e.g. five times in order to make the ion-exchange resin ready for another period of operation which may range up to several months.

The device signals the end of the regeneration, so that the client may switch the valve 156 to reconnect the rinsing circuit of the processor with the inlet 45 of the recovery device.

The following features may improve the operation of the described device.

Whatever is the method of biocide addition control, the device may be programmed in such a way that if rinse water is received from the processor within e.g. one hour after biocide has been added, this addition is disregarded which means that it will have to be repeated at the first suitable occasion.

Very limited supplies of rinsing water to the device, separated by relatively long periods, may be disregarded. This is in particular the case for a setting of a processor known as a "jogging program" which in the absence of any film supply during a longer period puts the processor into operation, for instance during one minute for each hour, in order to prevent the formation of liquid stains on film transport roller surfaces, etc.

Finally, the controlling microprocessor may consider a period of more than 24 hours after the last supply of rinsing water to the device as a holiday, so that no further biocide is added to the device. However, the control may be preferably such that biocide yet is added after an inoperative period of e.g. more than five days.

We claim:

1. A silver recovery device for recovering silver from rinse water from a periodically operational photographic film processing apparatus by treatment by passage through at least one bed of ion exchange resin particles which is fluidized by such passage of the rinse water, which device comprises a generally vertically arranged ion exchange resin holder for each such bed, said holder having water inlet and outlet openings at generally opposite ends thereof, circulation pump means connected to said inlet and outlet openings and operative to circulate said water therebetween and maintain said bed in fluidized condition, and circulation pump control means effective during a period when said processing apparatus is in operation to operate said pump means generally continuously and during a period when the processing apparatus is not in operation to operate said pump means intermittently whereby the resin bed in each such holder experiences quiescent periods interspersed with fluidized periods.

2. A silver recovery device as in claim 1 wherein at least two said resin holders are connected in series for operation in cascade relation.

3. A silver recovery device as in claim 1 wherein said resin holder has a second outlet opening at a level above that of said first outlet opening for discharging excess water from the resin holder.

4. A silver recovery device as in claim 3 including on-line means for regenerating the resin in each said resin holder when substantially exhausted which comprises conduit means for furnishing regenerating liquid to at least one such control holder and means for preventing fresh rinse water from being supplied to the device while regeneration is taking place.

5. A silver recovery device as in claim 4 wherein said film processing apparatus comprises means for contacting the film with fixing solution and said fixing solution is employed by said regenerating means as the regenerating liquid.

6. A silver recovery device as in claim 5 wherein the film processing apparatus includes electrolytic silver recovery means for extracting silver from used fixing solution, and further comprising integrating means for measuring the total amount of electric current consumed by said electrolytic recovery means and control means for initiating regeneration in response to said integrating means.

7. A silver recovery device as in claim 1 wherein a separate liquid control holder is connected in the liquid circuit between the outlet of each such resin holder and said circulating pump means for receiving water leaving said resin holder through its outlet opening, said control holder having an outlet opening adjacent the bottom thereof connected to the suction side of said circulating pump means and a diverter outlet opening disposed above said bottom opening for diverting excess water from said control holder.

8. A silver recovery device as in claim 7 wherein said control holder has liquid level control means associated therewith for reducing the flow of water thereto from the outlet opening of said resin holder when the level of water therein reaches a predetermined level.

9. A silver recovery device as in claim 8 comprising at least one further liquid control holder for receiving water diverted from the outlet of the prior control holder outlet when flow is reduced to the latter.

10. A silver recovery device as in claim 9 wherein each said further control holder has an outlet opening adjacent the bottom thereof, and further comprising circulating pump means in association with each such further control holder and in communication on its suction side with the bottom outlet opening of the latter, and an additional resin holder for each further control holder having a bottom inlet opening connected to the pressure side of its pump means and a top outlet opening in circulating communication with the associated control holder, each said further control holder including a diverter outlet opening at a predetermined level above its bottom for diverting excess water circulated thereto to the next control holder.

11. A silver recovery device as in claim 10 including a collection vessel for receiving excess water diverted from the last control holder.

12. A silver recovery device as in claim 10 including a delivery conduit between each resin holder outlet and its associated control liquid holder for delivering circulated water from the former to the latter and said diverter outlet opening is formed as a branch of said delivery conduit.

13. A silver recovery device as in claim 12 wherein said diverter outlet opening is formed by an opening in a side wall of said control holder.

14. A silver recovery device as in claim 12 wherein each control holder is divided by a partition wall into two compartments which are in communication via an opening in said partition wall adjacent its bottom, said delivery conduit opens into the first compartment and includes a branch for diverting water into the second compartment, and the second compartment has a discharge opening in a wall thereof for discharging water to the next control holder or to a collector vessel.

15. A silver recovery device as in claim 14 wherein the cross-sectional area of said partition wall opening is less than that of said conduit branch and the bottom outlet opening of said control holder is in said first compartment.

16. A silver recovery device as in claim 8 which further comprises a level sensor for the water level in each such control holder which is located below said predetermined level therein and second pump means operative in response to said level sensor for withdrawing water from said control holder until the water level therein falls below the sensor level.

17. A silver recovery device as in claim 7 wherein said resin holder has the form of a pack cartridge adapted to be connected into and removed from the device.

18. A silver recovery device as in claim 1 including means for regenerating the resin particles after the ion exchange capacity thereof has been substantially exhausted.

19. A silver recovery device as in claim 18 wherein said photographic film processing apparatus includes means for applying a film fixing solution to said film and used fixing solution is employed by said regeneration means for regenerating the exhausted resin.

20. A silver recovery device as in claim 19 wherein each resin bed is contained in a permeable package adapted to be loaded into and removed from a resin holder and said regeneration means is adapted to receive at least one such removed resin package for regenerating the same.

21. A silver recovery device as in claim 1 including heating means for heating the water in each said resin holder during said quiescent periods.

* * * * *